United States Patent
Ro et al.

(10) Patent No.: US 9,634,334 B2
(45) Date of Patent: Apr. 25, 2017

(54) LAMINATED THIN FILM BATTERY

(71) Applicant: GS ENERGY CORPORATION, Seoul (KR)

(72) Inventors: Dae-Sung Ro, Seoul (KR); Jae-Hwan Ko, Seoul (KR)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 14/406,144

(22) PCT Filed: May 14, 2013

(86) PCT No.: PCT/KR2013/004258
§ 371 (c)(1),
(2) Date: Dec. 5, 2014

(87) PCT Pub. No.: WO2013/183866
PCT Pub. Date: Dec. 12, 2013

(65) Prior Publication Data
US 2015/0125731 A1    May 7, 2015

(30) Foreign Application Priority Data
Jun. 8, 2012  (KR) .................. 10-2012-0061452

(51) Int. Cl.
*H01M 2/02*    (2006.01)
*H01M 6/40*    (2006.01)
(Continued)

(52) U.S. Cl.
CPC .............. *H01M 6/40* (2013.01); *H01M 2/08* (2013.01); *H01M 2/1061* (2013.01);
(Continued)

(58) Field of Classification Search
CPC .. H01M 10/0436; H01M 2/08; H01M 2/1061; H01M 2/204; H01M 2/26; H01M 2/30; H01M 6/40
See application file for complete search history.

(56) References Cited

U.S. PATENT DOCUMENTS 6,080,267 A * 6/2000 Hope .................... C09J 5/00
                                                    156/305
2010/0190051 A1* 7/2010 Aitken ............. H01M 2/1061
                                                    429/162
(Continued)

FOREIGN PATENT DOCUMENTS

JP    2003297334 A    10/2003
JP    2007103129 A    4/2007
(Continued)

OTHER PUBLICATIONS

European extended search report dated May 4, 2015 from EPO in connection with the counterpart European Patent Application No. 13800027.8, citing the above reference(s).
International Search Report for PCT/KR2013/004258, citing the above reference(s).
(Continued)

*Primary Examiner* — Patrick Ryan
*Assistant Examiner* — Ben Lewis
(74) *Attorney, Agent, or Firm* — Pillsbury Winthrop Shaw Pittman LLP

(57) ABSTRACT

Disclosed is a laminated thin film battery which is capable of exhibiting a high capacity and does not require a separate barrier to be formed on a surface after lamination. A first thin film battery and a second thin film battery, in which cathode current collectors and anode current collectors are formed on first surfaces, are laminated in such a type that the respective first surfaces face each other. The cathode current collectors of the first thin film battery and the second thin film battery are electrically connected to a cathode terminal, and the (Continued)

anode current collectors of the first thin film battery and the second thin film battery are electrically connected to an anode terminal.

21 Claims, 8 Drawing Sheets

(51) Int. Cl.
    *H01M 2/20*     (2006.01)
    *H01M 2/30*     (2006.01)
    *H01M 2/08*     (2006.01)
    *H01M 2/10*     (2006.01)
    *H01M 10/04*     (2006.01)
    *H01M 2/26*     (2006.01)

(52) U.S. Cl.
    CPC ............. *H01M 2/204* (2013.01); *H01M 2/26* (2013.01); *H01M 2/30* (2013.01); *H01M 10/0436* (2013.01)

(56) References Cited

U.S. PATENT DOCUMENTS

2010/0227214 A1*   9/2010   Krasnov ............. H01M 2/0404
                                                                       429/175
2010/0330411 A1   12/2010   Nam et al.
2011/0223467 A1    9/2011   Shacklette et al.

FOREIGN PATENT DOCUMENTS

| JP | 2010272266 A | 12/2010 |
| JP | 2010277925 A | 12/2010 |
| KR | 1020090010444 A | 1/2009 |
| KR | 1020090113106 A | 10/2009 |
| KR | 1020120040983 A | 4/2012 |

OTHER PUBLICATIONS

Japanese Office Action dated Nov. 24, 2015 in connection with the counterpart Japanese Patent Application No. 2015-515933, citing the above reference(s).

\* cited by examiner

LAMINATED THIN FILM BATTERY

TECHNICAL FIELD

The present disclosure relates to a thin film battery, and more particularly, to a laminated thin film battery which is capable of exhibiting a high capacity, is easy to realize external terminals, and allows omission of a separate surface barrier after lamination.

BACKGROUND ART

A thin film battery refers to a battery of which basic component elements are formed as thin films to achieve a thin thickness.

A thin film battery has all component elements such as a cathode, an electrolyte and an anode which are formed into solid states, and is manufactured on a thin substrate through a deposition method such as CVD (chemical vapor deposition) or PVD (physical vapor deposition) to have a thickness of about several microns.

A thin film battery provides various advantages in that the likelihood of an explosion to occur is small due to use of a solid electrolyte such as LiPON, high temperature stability is excellent, self-discharge rate is low, and a service life characteristic is excellent.

Meanwhile, because a thin film battery itself is not large in capacity, a technology of electrically connecting at least two thin film batteries by laminating unit thin film batteries in an effort to increase capacity has been suggested in the art.

Korean Unexamined Patent Publication No. 10-2009-0113106 (dated Oct. 29, 2009) discloses a high capacity thin film battery module of a type in which unit thin film batteries are laminated.

According to the document, a first thin film battery and a second thin film battery are laminated in such a type that the first surface (the current collector forming surface) of the first thin film battery and the second surface (the lower surface of a substrate) of the second thin film battery face each other.

However, in such a type of a thin film battery lamination structure, a thick barrier for preventing penetration of moisture should be formed on the thin film battery positioned uppermost, after lamination, and it is difficult to realize external terminals.

DISCLOSURE

Technical Problem

Various embodiments are directed to a laminated thin film battery which is capable of exhibiting a high capacity, allows omission of forming a thick barrier after lamination, and is easy to realize external terminals.

Technical Solution

In an embodiment, a laminated thin film battery may be provided, wherein a first thin film battery and a second thin film battery, in which cathode current collectors and anode current collectors are formed on first surfaces, are laminated in such a type that the respective first surfaces face each other, and wherein the cathode current collectors of the first thin film battery and the second thin film battery are electrically connected to a cathode terminal, and the anode current collectors of the first thin film battery and the second thin film battery are electrically connected to an anode terminal.

A sealing layer may be formed between the first thin film battery and the second thin film battery.

The cathode terminal and the anode terminal may be secured to and electrically connected to the cathode current collector and the anode current collector of the first thin film battery or the second thin film battery by conductive tapes, metal pastes or conductive adhesives. Also, the cathode terminal and the anode terminal may be secured to and electrically connected to the cathode current collector and the anode current collector of the first thin film battery or the second thin film battery through thermal bonding or ultrasonic bonding. Further, the cathode terminal and the anode terminal may be secured to the cathode current collector and the anode current collector of the first thin film battery or the second thin film battery by tapes, adhesives or pastes, and may be electrically connected to the cathode current collector and the anode current collector of the first thin film battery or the second thin film battery through wire bonding.

In the first thin film battery, the cathode current collector may be formed at a first side on the first surface, and the anode current collector may be formed at a second side on the first surface. In the second thin film battery, the cathode current collector may be formed at a second side on the first surface, and the anode current collector may be formed at a first side on the first surface.

In the first thin film battery, the cathode current collector may be formed at a first side on the first surface, and the anode current collector may be formed at a second side on the first surface. In the second thin film battery, the cathode current collector may be formed at a first side on the first surface, and the anode current collector may be formed at a second side on the first surface. The respective cathode current collectors may be electrically connected to the cathode terminal, the respective anode current collectors may be electrically connected to the anode terminal, and an electrical connection structure for isolating the cathode current collectors and the anode current collectors may be disposed between the first thin film battery and the second thin film battery. In this case, the first thin film battery and the second thin film battery may be laminated in a state in which the first thin film battery is horizontally rotated by 180° with respect to the second thin film battery. Also, the first thin film battery and the second thin film battery may be laminated in a state in which the first thin film battery is horizontally rotated by 360° with respect to the second thin film battery, and connection line parts which cross each other may be formed in the electrical connection structure.

Each of the first thin film battery and the second thin film battery may include a cathode current collector and an anode current collector formed over a substrate; a cathode formed on the cathode current collector and an anode formed on the anode current collector; and an electrolyte formed between the cathode and the anode.

In this case, each of the first thin film battery and the second thin film battery may further include a barrier covering remaining portions of the cathode current collector and the anode current collector except portions thereof.

Advantageous Effects

In the laminated thin film batteries according to the embodiments, since a first thin film battery and a second thin film battery may be connected in parallel through battery lamination, it is possible to exhibit a high capacity.

In particular, since the laminated thin film batteries according to the embodiments have a structure in which the first thin film battery and the second thin film battery are laminated in such a type that the surfaces of the first and second thin film batteries on which current collectors are formed face each other, it is not necessary to form a thick barrier after lamination.

Also, in the laminated thin film batteries according to the embodiments, since the surfaces on which the current collectors are formed face each other, external terminals may be easily realized between the first thin film battery and the second thin film battery.

MODE FOR INVENTION

In the present disclosure, advantages, features and methods for achieving them will become more apparent after a reading of the following exemplary embodiments taken in conjunction with the drawings.

However, the present disclosure should not be construed as being limited to the embodiments set forth herein, and may be embodied in various different forms. Rather, these embodiments are provided so that the present disclosure will be thorough and complete and will fully convey the scope of the present disclosure to those skilled in the art to which the disclosure pertains. Therefore, the present invention will be defined by the scope of the appended claims.

Hereinafter, laminated thin film batteries in accordance with embodiments will be described in detail with reference to the accompanying drawings.

Figure 1:
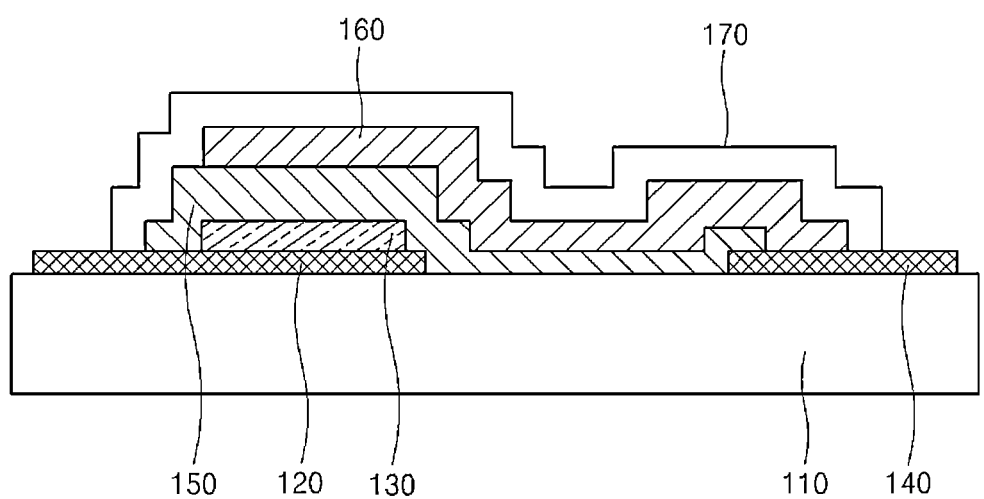
FIG. 1 illustrates an example of a thin film battery which may be applied to embodiments of the present disclosure.

FIG. 1 illustrates an example of a thin film battery which may be applied to embodiments of the present disclosure.

Referring to FIG. 1, a thin film battery has a structure in which a cathode current collector (CCC) 120, a cathode 130, an anode current collector (ACC) 140, an electrolyte 150, and an anode 160 are sequentially laminated in the patterns of thin films, respectively, on a substrate 110. The thin film battery is manufactured such that all elements are formed into thin solid films and the overall thickness of the elements excluding the substrate 110 is approximately several microns to approximately several tens of microns to be substantially very thin.

While an example of the type of a thin film battery is illustrated in FIG. 1, it is to be noted that a thin film battery to be used in the embodiments of the present disclosure is not limited to such an example and may have various types.

As aforementioned above, because a thin film battery itself is not large in capacity, at least two thin film batteries may be used by being electrically connected to exhibit a large capacity, and to this end, it is necessary to structurally laminate at least two thin film batteries.

The embodiments of the present disclosure provide a laminated thin film battery in which two thin film batteries are laminated such that, unlike the conventional art, the surfaces thereof formed with current collectors face each other.

Figure 2:
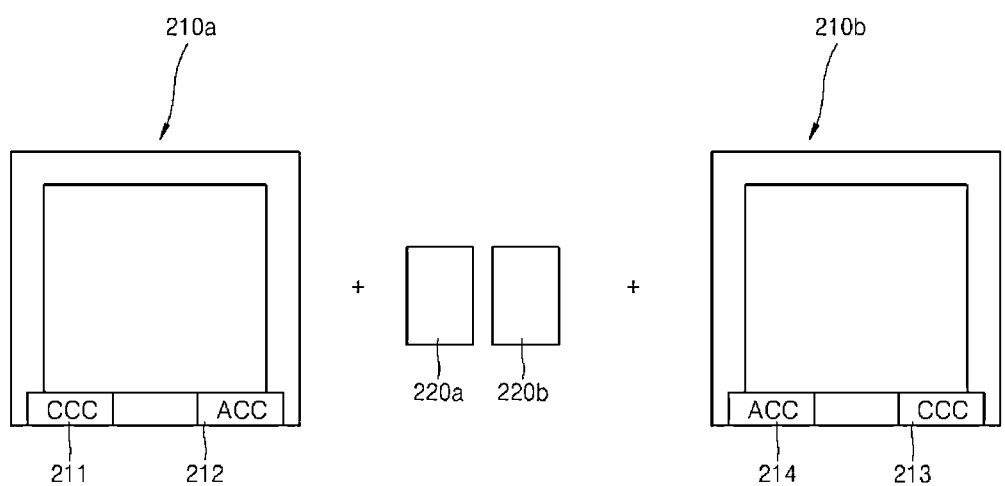
FIGS. 2 and 3 illustrate a laminated thin film battery in accordance with a first embodiment.
Figure 3:
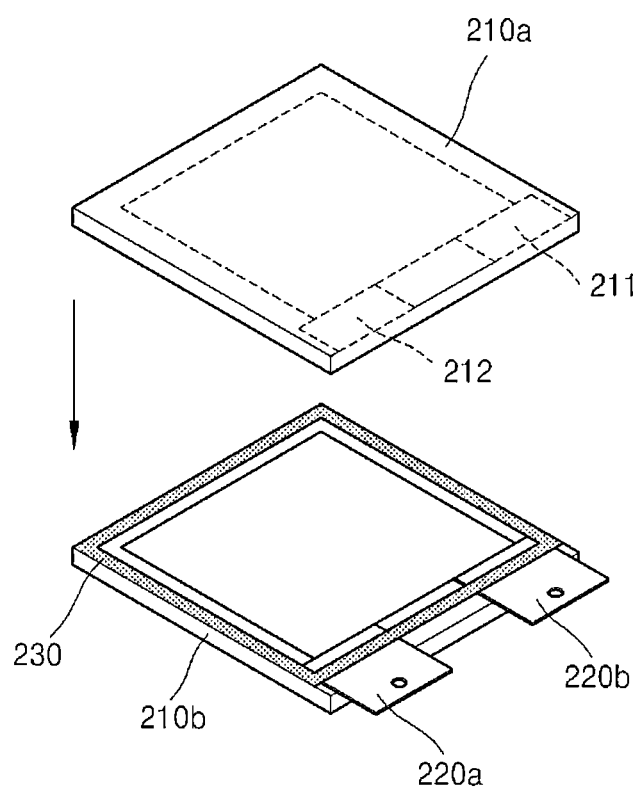

FIGS. 2 and 3 illustrate a laminated thin film battery in accordance with a first embodiment.

Referring to FIGS. 2 and 3, the laminated thin film battery in accordance with the first embodiment basically includes a first thin film battery 210a, a second thin film battery 210b, an anode terminal 220a, and a cathode terminal 220b.

The first thin film battery 210a and the second thin film battery 210b are respectively formed with cathode current collectors 211 and 213 and anode current collectors 212 and 214, on first surfaces thereof.

Referring to FIG. 3, in the embodiment, the first thin film battery 210a and the second thin film battery 210b are laminated in such a type that the first surfaces thereof face each other. The cathode current collectors 211 and 213 of the first thin film battery 210a and the second thin film battery 210b are commonly electrically connected to the cathode terminal 220b, and the anode current collectors 212 and 214 of the first thin film battery 210a and the second thin film battery 210b are commonly electrically connected to the anode terminal 220a.

In such a lamination structure in which the first surfaces of the first thin film battery 210a and the second thin film battery 210b face each other, since the first surfaces of the first thin film battery 210a and the second thin film battery 210b, which are vulnerable to moisture penetration, face each other, the first surface of the first thin film battery 210a is not exposed upward or the first surface of the second thin film battery 210b is not exposed downward. That is to say, in the lamination structure of thin film batteries that is applied to the embodiment, a second surface corresponding to the back surface of a substrate which is relatively invulnerable to moisture penetration is exposed upward or downward. Accordingly, it is possible to omit a process of forming a separate barrier on the first surface of an uppermost thin film battery to a thickness of approximately several tens of microns to prevent moisture from penetrating through the surface of the thin film battery after lamination.

Moreover, in the lamination structure in which the first surfaces of the first thin film battery 210a and the second thin film battery 210b face each other, since the anode terminal 220a and the cathode terminal 220b which are to be connected to an exterior may be inserted between the first thin film battery 210a and the second thin film battery 210b, it is possible to easily form external terminals.

Meanwhile, in the embodiment, because the laminated thin film battery has the lamination structure in which the first surfaces of the first thin film battery 210a and the second thin film battery 210b face each other, moisture may penetrate into the first surfaces of the first thin film battery 210a and the second thin film battery 210b through the space therebetween, and foreign substances such as dust may adhere to the first surfaces of the first thin film battery 210a and the second thin film battery 210b through the space therebetween. In order to prevent these, a sealing layer (see the reference numeral 230 of FIG. 3) may be additionally formed between the first surface of the first thin film battery 210a and the first surface of the second thin film battery 210b. The sealing layer 230 may be formed over the entire area or a partial area between the first surface of the first thin film battery 210a and the first surface of the second thin film battery 210b, or may be formed along peripheries as shown in FIG. 3.

Such a sealing layer 230 may be formed of epoxy, CPP (casted polypropylene), surlyn, glass, etc. Epoxy may be formed through thermosetting or UV (ultraviolet) curing, and CPP, surlyn and glass may be formed through heat fusion.

The anode terminal 220a and the cathode terminal 220b may be bonded to the anode current collector 212 and the cathode current collector 211 of the first surface of the first thin film battery 210a or may be bonded to the anode current collector 214 and the cathode current collector 213 of the first surface of the second thin film battery 210b, by using conductive tapes, metal pastes, heat, ultrasonic waves or wires, to be secured to the first thin film battery 210a or the second thin film battery 210b.

In detail, the anode terminal 220a and the cathode terminal 220b may be secured to and electrically connected to the anode current collector 212 or 214 and the cathode current collector 211 or 213 of the first thin film battery 210a or the second thin film battery 210b by conductive tapes, metal pastes or conductive adhesives.

Also, the anode terminal 220a and the cathode terminal 220b may be secured to and electrically connected to the anode current collector 212 or 214 and the cathode current collector 211 or 213 of the first thin film battery 210a or the second thin film battery 210b through thermal bonding or ultrasonic bonding.

Further, the anode terminal 220a and the cathode terminal 220b may be electrically connected to the anode current collector 212 or 214 and the cathode current collector 211 or 213 of the first thin film battery 210a or the second thin film battery 210b through wire bonding. However, in this case, in order to ensure that the anode terminal 220a and the cathode terminal 220b are fixed, the anode terminal 220a and the cathode terminal 220b may be secured to the anode current collector 212 or 214 and the cathode current collector 211 or 213 of the first thin film battery 210a or the second thin film battery 210b by tapes, adhesives or pastes.

In the laminated thin film battery shown in FIGS. 2 and 3, the first thin film battery 210a and the second thin film battery 210b have opposite shapes with respect to each other.

In other words, referring to FIGS. 2 and 3, in the first thin film battery 210a, the cathode current collector 211 is formed at a first side on the first surface, and the anode current collector 212 is formed at an opposite second side on the first surface. On the contrary, in the second thin film battery 210b, the cathode current collector 213 is formed at a second side on the first surface, and the anode current collector 214 is formed at an opposite first side on the first surface.

Figure 4:
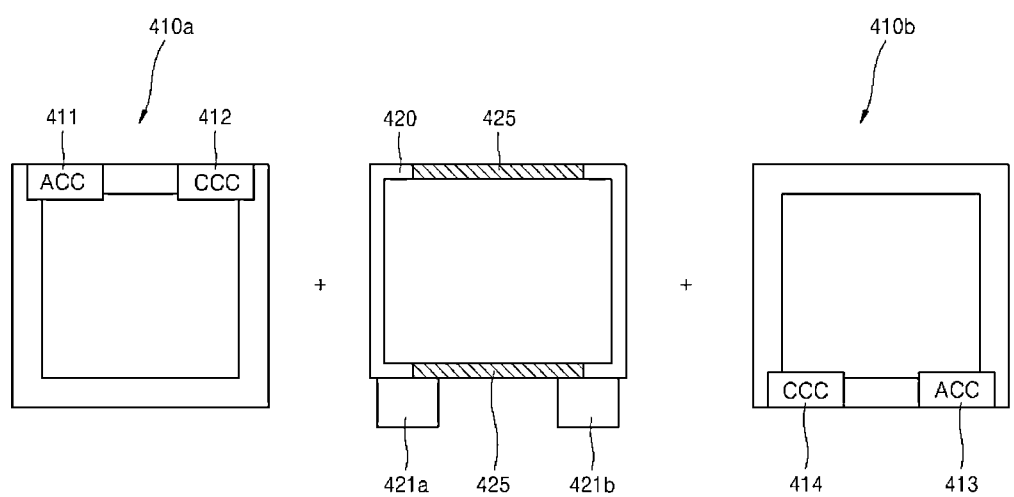
FIGS. 4 and 5 illustrate a laminated thin film battery in accordance with a second embodiment.
Figure 6:
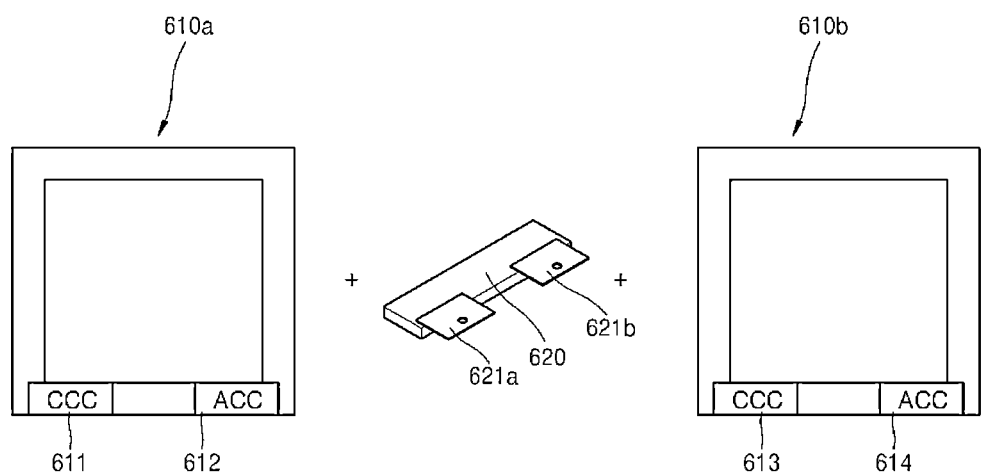
FIGS. 6 and 7 illustrate a laminated thin film battery in accordance with a third embodiment.

In this case, an advantage is provided in that connection may be made directly to the cathode terminal 220b and the anode terminal 220a without using a separate electrical connection structure (see the reference numeral 420 of FIG. 4 or the reference numeral 620 of FIG. 6).

Figure 5:
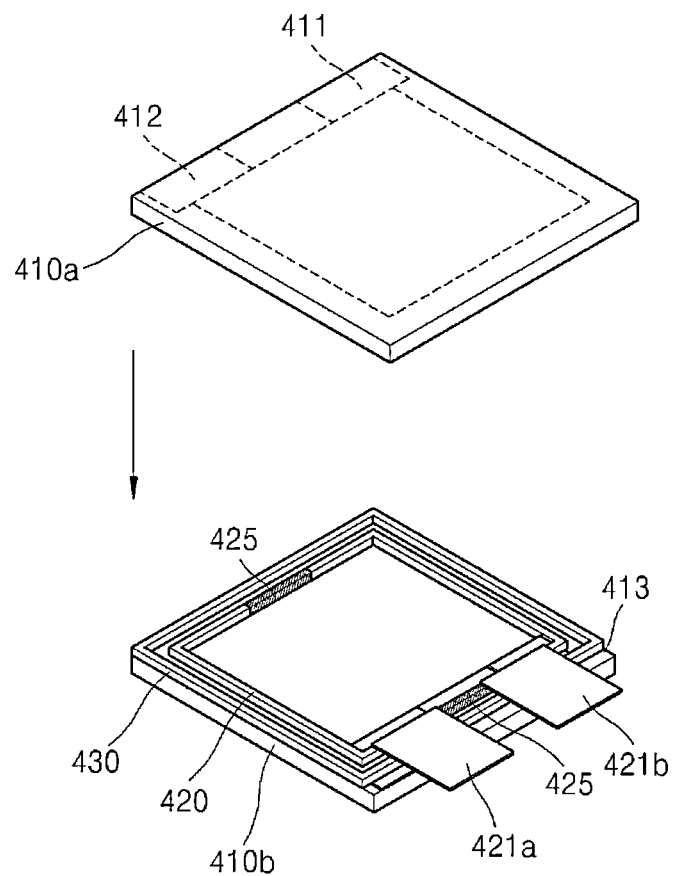

FIGS. 4 and 5 illustrate a laminated thin film battery in accordance with a second embodiment.

Even in the case of the laminated thin film battery shown in FIGS. 4 and 5, a first thin film battery 410a and a second thin film battery 410b are laminated in such a type that the first surface of the first thin film battery 410a, on which a cathode current collector 412 and an anode current collector 411 are formed, and the first surface of the second thin film battery 410b, on which a cathode current collector 414 and an anode current collector 413 are formed, face each other. Also, the cathode current collector 412 of the first thin film battery 410a and the cathode current collector 414 of the second thin film battery 410b are commonly electrically connected to a cathode terminal 421a, and the anode current collector 411 of the first thin film battery 410a and the anode current collector 413 of the second thin film battery 410b are commonly electrically connected to an anode terminal 421b.

However, in the laminated thin film battery shown in FIGS. 4 and 5, the first thin film battery 410a and the second thin film battery 410b have not opposite shapes but the same shapes.

Namely, in the first thin film battery 410a, the cathode current collector 412 is formed at a first side on the first surface, and the anode current collector 411 is formed at an opposite second side on the first surface. In the second thin film battery 410b, the cathode current collector 414 is formed at a first side on the first surface, and the anode current collector 413 is formed at an opposite second side on the first surface.

In this case, in order to realize parallel connection while laminating the first thin film battery 410a and the second thin film battery 410b such that the first surfaces thereof face each other, a separate electrical connection structure 420 as shown in FIG. 4 is needed.

The electrical connection structure 420 allows the respective anode current collectors 411 and 413 to be electrically connected to the anode terminal 421b, and allows the respective cathode current collectors 412 and 414 to be electrically connected to the cathode terminal 421a. The electrical connection structure 420 has insulation parts 425 for electrically isolating the anode current collectors 411 and 413 and the cathode current collectors 412 and 414.

Such an electrical connection structure 420 may be disposed between the first thin film battery 410a and the second thin film battery 410b.

In the case of the laminated thin film battery shown in FIGS. 4 and 5, the first thin film battery 410a and the second thin film battery 410b are laminated in the state in which the first thin film battery 410a is horizontally rotated by 180° with respect to the second thin film battery 410b. In this case, since the respective cathode current collectors 412 and 414 may be positioned at one side and the respective anode current collectors 411 and 413 may be positioned at the other side, the structure of the electrical connection structure 420 may be simplified.

Meanwhile, in the laminated thin film battery shown in FIGS. 4 and 5, the cathode terminal 421a and the anode terminal 421b may be formed integrally with the electrical connection structure 420. Otherwise, the terminals 421a and 421b may be bonded to the electrical connection structure 420 by metal pastes, conductive tapes, or the likes. Alternatively, the terminals 421a and 421b may be bonded to the cathode current collector 412 or 414 and the anode current collector 411 or 413 of the first thin film battery 410a or the second thin film battery 410b by metal pastes, conductive tapes or the likes, and in this case, the electrical connection structure 420 may be electrically connected to the terminals 421a and 421b. The reference numeral 430 designates a sealing layer.

Figure 7:
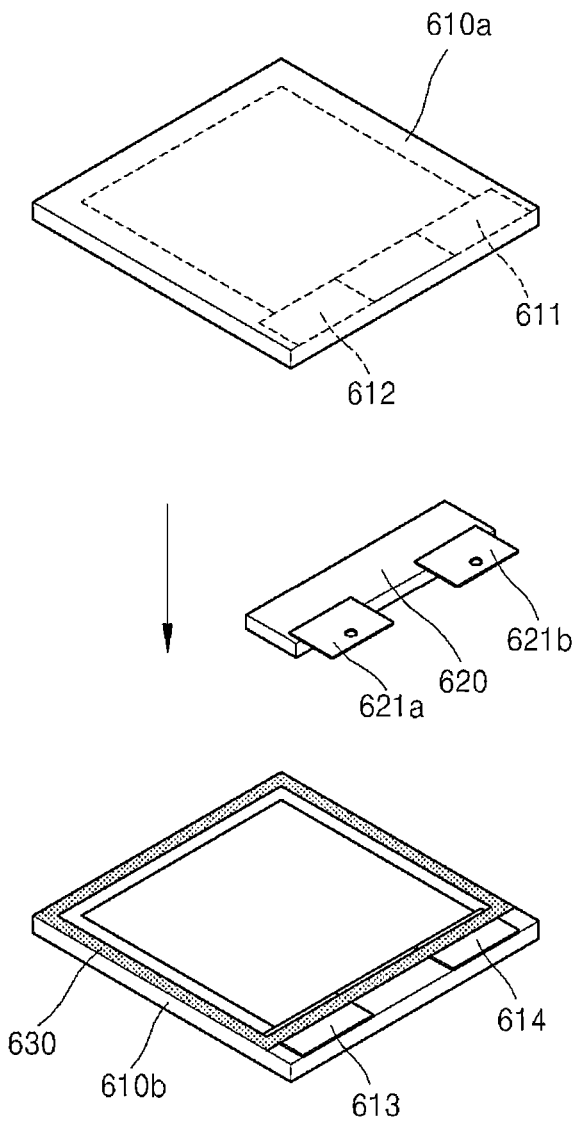

FIGS. 6 and 7 illustrate a laminated thin film battery in accordance with a third embodiment.

Even in the case of the laminated thin film battery shown in FIGS. 6 and 7, a first thin film battery 610a and a second thin film battery 610b are laminated in such a type that the first surface of the first thin film battery 610a, on which a cathode current collector 611 and an anode current collector 612 are formed, and the first surface of the second thin film battery 610b, on which a cathode current collector 613 and an anode current collector 614 are formed, face each other. Also, the cathode current collector 611 of the first thin film battery 610a and the cathode current collector 613 of the second thin film battery 610b are commonly electrically connected to a cathode terminal 621b, and the anode current collector 612 of the first thin film battery 610a and the anode current collector 614 of the second thin film battery 610b are commonly electrically connected to an anode terminal 621a.

Moreover, the first thin film battery 610a and the second thin film battery 610b are formed to have not opposite shapes but the same shapes.

In the case of the laminated thin film battery shown in FIGS. 6 and 7, the first thin film battery 610a and the second thin film battery 610b are laminated in the state in which the first thin film battery 610a is horizontally rotated by 0° or 360° with respect to the second thin film battery 610b.

In this case, the cathode current collector 611 of the first thin film battery 610a and the anode current collector 614 of the second thin film battery 610b face each other, and the anode current collector 612 of the first thin film battery 610a and the cathode current collector 613 of the second thin film battery 610b face each other.

Even in this case, a separate electrical connection structure 620 is needed.

Figure 8:
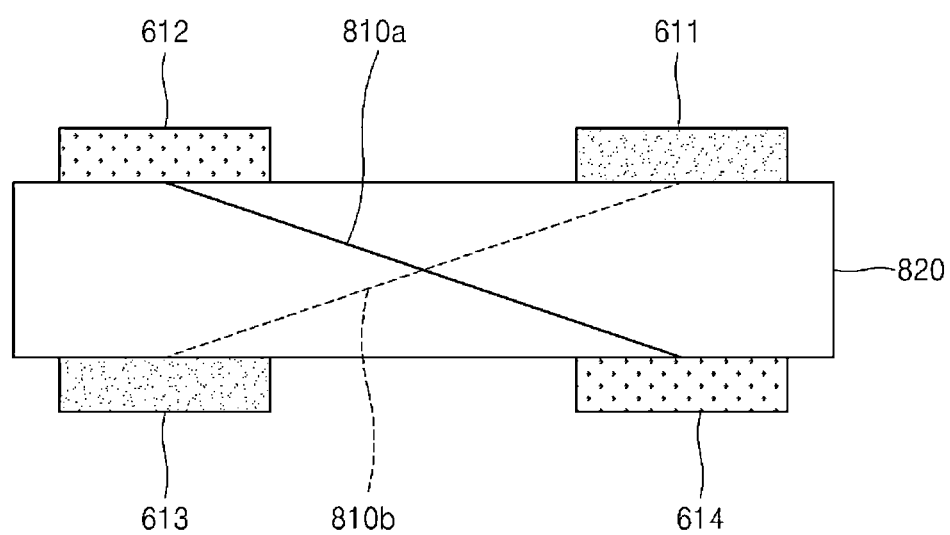
FIG. 8 schematically illustrates an electrical connection structure which may be applied to the third embodiment.

FIG. 8 schematically illustrates an electrical connection structure which may be applied to the third embodiment.

Referring to FIG. 8, in order to form the laminated thin film battery shown in FIGS. 6 and 7, connection line parts 810a and 810b which cross each other may be formed in the electrical connection structure, and the remaining portion may be formed as an insulation part 820.

In the laminated thin film battery shown in FIGS. 6 and 7, similarly to the laminated thin film battery shown in FIGS. 4 and 5, the cathode terminal 621b and the anode terminal 621a may be formed integrally with the electrical connection structure 620, may be bonded to the electrical connection structure 620, or may be bonded to the cathode current collector 611 or 613 and the anode current collector 612 or 614 of the first thin film battery 610a or the second thin film battery 610b. The reference numeral 630 designates a sealing layer.

Meanwhile, each of a first thin film battery and a second thin film battery includes, as shown in FIG. 1, the cathode current collector 120 and the anode current collector 140 which are formed on the substrate 110, the cathode 130 which is formed on the cathode current collector 120, the anode 160 which is formed on the anode current collector 140, and the electrolyte 150 which is formed between the cathode 130 and the anode 160.

The substrate 110 may be formed of a metal, glass, mica, polymer, etc.

Each of the first thin film battery and the second thin film battery may further include a barrier 170 which covers the remaining portions of the cathode current collector 120 and the anode current collector 140 except portions thereof to prevent reaction of the anodes 160 of the respective first and second thin film batteries, prevent penetration of moisture into the respective first and second thin film batteries and prevent the anode 160 of the first thin film battery and the anode 160 of the second thin film battery from being brought into contact with each other.

The barrier 170 may be formed in a film type or a thin film type. While the thickness of the barrier 170 is not specifically limited, it is advantageous in terms of size and manufacturing cost to form the barrier 170 to have a minimum thickness capable of suppressing the reaction of the anode 160, and the barrier 170 may have a thickness of approximately 1 μm to approximately 10 μm. This thickness corresponds to a thickness that is remarkably thin when compared to a barrier which is formed on a conventional thin film battery and has a thickness equal to or larger than several tens of microns.

As is apparent from the above descriptions, since the laminated thin film batteries according to the embodiments have a structure in which a first thin film battery and a second thin film battery are laminated in such a type that first surfaces of the first and second thin film batteries on which cathode current collectors and anode current collectors are formed face each other, it is not necessary to form a thick barrier after lamination.

Also, in the laminated thin film batteries according to the embodiments, since the surfaces on which the current collectors are formed face each other, external terminals may be easily realized between the first thin film battery and the second thin film battery.

Although various embodiments have been described above with reference to the accompanying drawings, the present disclosure is not limited to the embodiments and may be changed in various different forms, and it will be understood to those skilled in the art that the present disclosure may be worked in other concrete forms without changing the technical spirits and essential features of the present disclosure. Accordingly, it is to be noted that the disclosure described herein is for illustration purposes only, and is not intended to limit the disclosure in any way.

The invention claimed is:

1. A laminated thin film battery, comprising:
   a first thin film battery and a second thin film battery, the first thin film battery and the second thin film battery each comprising:
   a first substrate comprising a first surface;
   a cathode current collector over the first surface, the cathode current collector comprising a second surface facing the first surface and a third surface opposite the first surface;
   an anode current collector over the first surface, the anode current collector comprising a fourth surface facing the first surface and a fifth surface opposite the fourth surface;
   a cathode in contact with one or more portions of the third surface;
   an anode in contact with one of more portions of the fifth surface;
   a barrier over the cathode and over the anode, wherein the barrier is in contact with one or more portions of the third surface other than the one or more portions of the third surface in contact with the cathode, and with one or more portions of the fifth surface other than the one or more portions of the fifth surface in contact with the anode;
   a cathode terminal electrically connected to the cathode current collector of at least one of the first thin film battery or the second thin film battery; and
   an anode terminal electrically connected to the anode current collector of at least one of the first thin film battery or the second thin film battery; and
   an electrical connection structure between the first thin film battery and the second thin film battery, the electrical connection structure being configured to:
      electrically connect the cathode current collector of the first thin film battery with the cathode terminal;
      electrically connect the cathode current collector of the second thin film battery with the cathode terminal;

electrically connect the anode current collector of the first thin film battery with the anode terminal;

electrically connect the anode current collector of the second thin film battery with the anode terminal; and electrically isolate the cathode current collector of each of the first thin film battery and the second thin film battery from the anode current collector of each of the first thin film battery and the second thin film battery;

wherein the first thin film battery and the second thin film battery are laminated such that the first surface of the first thin film battery faces the first surface of the second thin film battery, and the cathode current collector of the first thin film battery is electrically connected with the cathode of the first thin film battery, the cathode current collector of the second thin film battery is electrically connected to the cathode of the second thin film battery, the anode current collector of the first thin film battery is electrically connected with the anode of the first thin film battery, and the anode current collector of the second thin film battery is electrically connected to the anode of the second thin film battery.

2. The laminated thin film battery according to claim 1, further comprising:

a sealing layer between the first surface of the first thin film battery and the first surface of the second thin film battery.

3. The laminated thin film battery according to claim 2, wherein the sealing layer comprises one or more of a material selected among epoxy, CPP (casted polypropylene), surlyn, or glass.

4. The laminated thin film battery according to claim 1, wherein each of the first thin film battery and the second thin film battery further comprises:

an electrolyte material between the cathode and the anode.

5. The laminated thin film battery according to claim 4, wherein the barrier conformally covers at least a portion of the anode and at least a portion of the electrolyte material.

6. The laminated thin film battery according to claim 1, wherein the barrier is a film type or a thin film type.

7. The laminated thin film battery according to claim 1, wherein the substrate comprises one or more of a metal, glass, mica, or a polymer.

8. A laminated thin film battery, comprising:

a first thin film battery and a second thin film battery, the first thin film battery and the second thin film battery each comprising:

a first substrate comprising a first surface;

a cathode current collector over the first surface, the cathode current collector comprising a second surface facing the first surface and a third surface opposite the first surface;

an anode current collector over the first surface, the anode current collector comprising a fourth surface facing the first surface and a fifth surface opposite the fourth surface;

a cathode in contact with one or more portions of the third surface;

an anode in contact with one of more portions of the fifth surface;

a barrier over the cathode and over the anode, wherein the barrier is in contact with one or more portions of the third surface other than the one or more portions of the third surface in contact with the cathode, and with one or more portions of the fifth surface other than the one or more portions of the fifth surface in contact with the anode; and an electrical connection structure configured to electrically connect the cathode current collector of the first thin film battery with the cathode current collector of the second thin film battery, and to electrically connect the anode current collector of the first thin film battery with the anode current collector of the second thin film battery, wherein the electrical connection structure comprises at least two crossing wires configured to facilitate the electrical connections, the electrical connection structure is configured to maintain an electrical isolation between the cathode current collectors of the first thin film battery and the second thin film battery, and anode current collectors of the first thin film battery and the second thin film battery, the cathode current collector of the first thin film battery is a first side of the first surface of the first thin film battery, the anode current collector of the first thin film battery is over a second side of the first surface of the first thin film battery different from the first side, the cathode current collector of the second thin film battery is over the first side of the first surface the first thin film battery, the anode current collector of the second thin film battery is over the second side of the first surface of the first thin film battery, the first thin film battery and the second thin film battery are laminated such that the first surface of the first thin film battery faces the first surface of the second thin film battery, and the cathode current collector of the first thin film battery is electrically connected with the cathode of the first thin film battery, the cathode current collector of the second thin film battery is electrically connected to the cathode of the second thin film battery, the anode current collector of the first thin film battery is electrically connected with the anode of the first thin film battery, and the anode current collector of the second thin film battery is electrically connected to the anode of the second thin film battery.

9. The laminated thin film battery according to claim 8, further comprising:

a sealing layer between the first surface of the first thin film battery and the first surface of the second thin film battery.

10. The laminated thin film battery according to claim 9, wherein the sealing layer comprises one or more of a material selected among epoxy, CPP (casted polypropylene), surlyn, or glass.

11. The laminated thin film battery according to claim 8, wherein each of the first thin film battery and the second thin film battery further comprises:

an electrolyte material between the cathode and the anode.

12. The laminated thin film battery according to claim 11, wherein the barrier conformally covers at least a portion of the anode and at least a portion of the electrolyte material.

13. The laminated thin film battery according to claim 8, wherein the barrier is a film type or a thin film type.

14. The laminated thin film battery according to claim 8, wherein the substrate comprises one or more of a metal, glass, mica, or a polymer.

15. A laminated thin film battery, comprising:
a first thin film battery and a second thin film battery, the first thin film battery and the second thin film battery each comprising:
   a first substrate comprising a first surface;
   a cathode current collector over the first surface, the cathode current collector comprising a second surface facing the first surface and a third surface opposite the first surface;
   an anode current collector over the first surface, the anode current collector comprising a fourth surface facing the first surface and a fifth surface opposite the fourth surface;
   a cathode in contact with one or more portions of the third surface;
   an anode in contact with one of more portions of the fifth surface;
a barrier over the cathode and over the anode, wherein the barrier is in contact with one or more portions of the third surface other than the one or more portions of the third surface in contact with the cathode, and with one or more portions of the fifth surface other than the one or more portions of the fifth surface in contact with the anode; and
   an electrical connection structure configured to electrically connect the cathode current collector of the first thin film battery with the cathode current collector of the second thin film battery, and to electrically connect the anode current collector of the first thin film battery with the anode current collector of the second thin film battery,
wherein
the electrical connection structure comprises at least two crossing wires configured to facilitate the electrical connections,
the electrical connection structure is configured to maintain an electrical isolation between the cathode current collectors of the first thin film battery and the second thin film battery, and anode current collectors of the first thin film battery and the second thin film battery,
the cathode current collector of the first thin film battery is over a first side of the first surface of the first thin film battery,
the anode current collector of the first thin film battery is over a second side of the first surface of the first thin film battery different from the first side,
the cathode current collector of the second thin film battery is over the second side of the first surface of the first thin film battery,
the anode current collector of the second thin film battery is over the first side of the first surface of the first thin film battery,
the first thin film battery and the second thin film battery are laminated such that the first surface of the first thin film battery faces the first surface of the second thin film battery, and
the cathode current collector of the first thin film battery is electrically connected with the cathode of the first thin film battery, the cathode current collector of the second thin film battery is electrically connected to the cathode of the second thin film battery, the anode current collector of the first thin film battery is electrically connected with the anode of the first thin film battery, and the anode current collector of the second thin film battery is electrically connected to the anode of the second thin film battery.

16. The laminated thin film battery according to claim 15, further comprising:
   a sealing layer between the first surface of the first thin film battery and the first surface of the second thin film battery.

17. The laminated thin film battery according to claim 16, wherein the sealing layer comprises one or more of a material selected among epoxy, CPP (casted polypropylene), surlyn, or glass.

18. The laminated thin film battery according to claim 15, wherein each of the first thin film battery and the second thin film battery further comprises:
   an electrolyte material between the cathode and the anode.

19. The laminated thin film battery according to claim 18, wherein the barrier conformally covers at least a portion of the anode and at least a portion of the electrolyte material.

20. The laminated thin film battery according to claim 15, wherein the barrier is a film type or a thin film type.

21. The laminated thin film battery according to claim 15, wherein the substrate comprises one or more of a metal, glass, mica, or a polymer.

* * * * *

UNITED STATES PATENT AND TRADEMARK OFFICE
CERTIFICATE OF CORRECTION

PATENT NO. : 9,634,334 B2  
APPLICATION NO. : 14/406144  
DATED : April 25, 2017  
INVENTOR(S) : Ro et al.

Page 1 of 1

It is certified that error appears in the above-identified patent and that said Letters Patent is hereby corrected as shown below:

In the Claims

In Column 8, Line 44, in Claim 1, delete "one of" and insert -- one or --, therefor.

In Column 8, Line 55, in Claim 1, delete "battery; and" and insert -- battery; --, therefor.

In Column 9, Line 63, in Claim 8, delete "one of" and insert -- one or --, therefor.

In Column 10, Line 28, in Claim 8, delete "surface the" and insert -- surface of the --, therefor.

In Column 11, Line 17, in Claim 15, delete "one of" and insert -- one or --, therefor.

Signed and Sealed this  
Twenty-fifth Day of July, 2017

Joseph Matal  
*Performing the Functions and Duties of the*  
*Under Secretary of Commerce for Intellectual Property and*  
*Director of the United States Patent and Trademark Office*